(12) United States Patent
Hall

(10) Patent No.: US 6,536,228 B1
(45) Date of Patent: Mar. 25, 2003

(54) DRY COMPARTMENT COOLER

(76) Inventor: Matthew C. Hall, 35904 E. Lake Seneca Rd., Eustis, FL (US) 32736

( * ) Notice: Subject to any disclaimer, the term of this patent is extended or adjusted under 35 U.S.C. 154(b) by 0 days.

(21) Appl. No.: 10/115,099

(22) Filed: Apr. 2, 2002

(51) Int. Cl.[7] .................................................. F25D 3/08
(52) U.S. Cl. ...................... 62/457.2; 62/457.7; 62/459; 62/463; 62/464
(58) Field of Search ........................... 62/457.7, 457.2, 62/459, 463, 464

(56) References Cited

U.S. PATENT DOCUMENTS

| | | | | |
|---|---|---|---|---|
| 4,238,934 A | * | 12/1980 | Hotta | 62/457 |
| 4,287,943 A | * | 9/1981 | Hotta | 165/104.19 |
| 4,424,687 A | | 1/1984 | Morgan | |
| 4,499,998 A | * | 2/1985 | Carlson | 206/541 |
| 4,565,074 A | | 1/1986 | Morgan | |
| 4,704,875 A | * | 11/1987 | Kieler | 62/372 |
| 5,052,184 A | | 10/1991 | Jarvis | |
| 5,052,185 A | | 10/1991 | Spahr | |
| 5,103,651 A | * | 4/1992 | Coelho et al. | 62/341 |
| 5,524,761 A | | 6/1996 | Wayman | |
| 5,535,883 A | * | 7/1996 | Henderson | 206/427 |
| 5,605,056 A | | 2/1997 | Brown et al. | |
| 5,636,524 A | | 6/1997 | Woods et al. | |
| 5,865,037 A | * | 2/1999 | Bostic | 62/371 |
| 5,884,499 A | * | 3/1999 | Samborn et al. | 62/252 |
| 6,003,329 A | * | 12/1999 | Stanton, Jr. | 62/372 |
| 6,126,124 A | | 10/2000 | Wagner | |
| 6,244,064 B1 | * | 6/2001 | Powell et al. | 62/457.2 |
| 6,276,162 B1 | * | 8/2001 | Schemel | 62/457.2 |
| 6,357,252 B1 | * | 3/2002 | Rand | 62/457.7 |

* cited by examiner

Primary Examiner—William Doerrler
Assistant Examiner—Mark Shulman
(74) Attorney, Agent, or Firm—Edward M. Livingston, Esq.

(57) ABSTRACT

A dry-compartment cooler has a dry compartment (1) with compartment walls (3) that are connected water-tightly to a compartment floor (4). The compartment walls are articulated to extend upwardly from proximate a riser framework (6) on a cooler floor (7) to proximate a bottom side of a cooler lid (8) of a predetermined cooler. One or more ice compartments (10, 11, 12, 13, 14) separate ice and water from inside surfaces of the compartment walls and from space inside of the dry compartment. The ice compartments are in fluid communication intermediate proximate the bottom side of the cooler lid and riser-framework space (9) where the riser framework is positioned under the compartment floor. The compartment walls can have heat-conveyance members (27) for conveying coldness and for deterring moisture formation on food and other items being cooled.

33 Claims, 7 Drawing Sheets

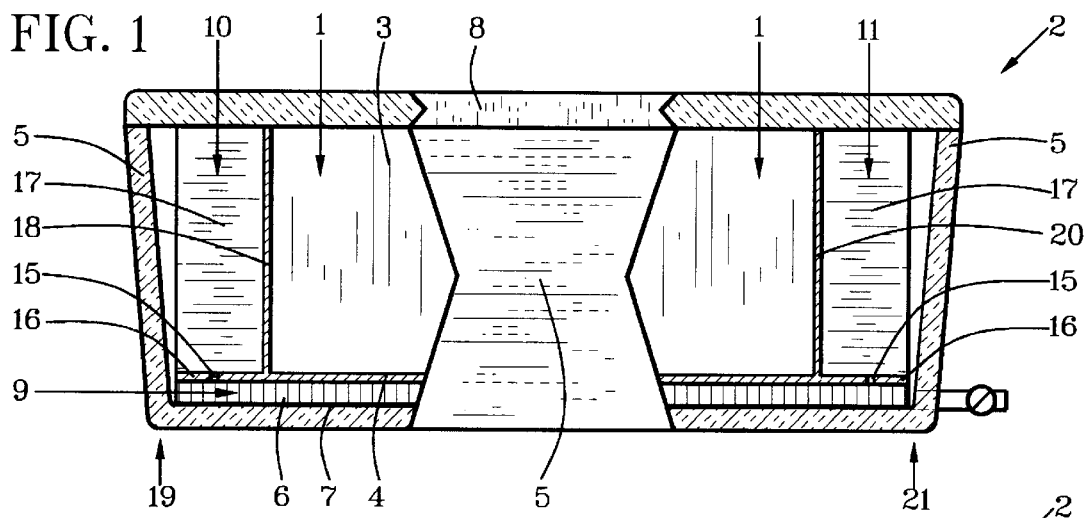
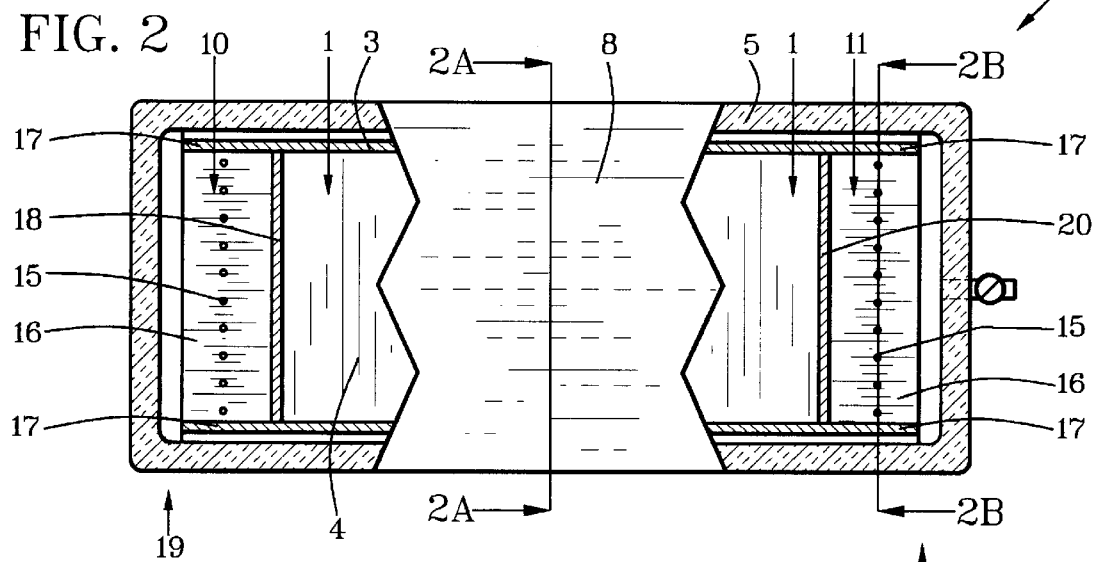
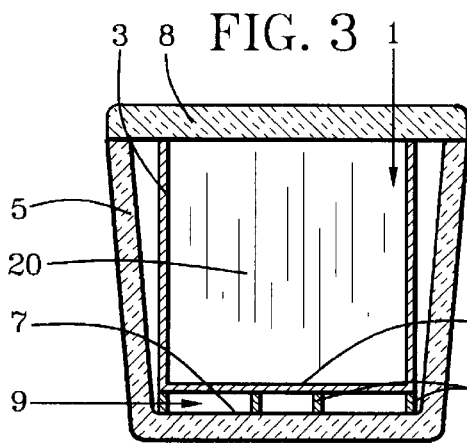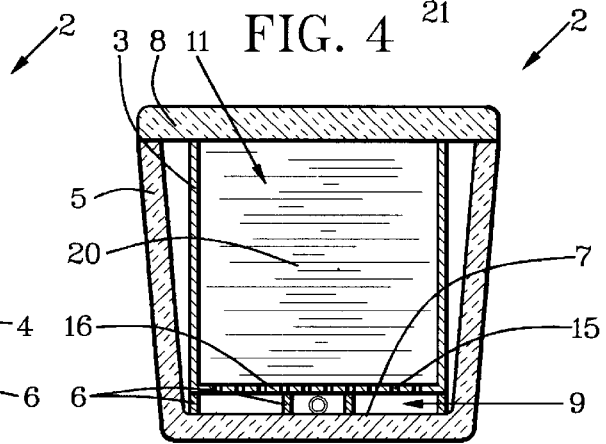

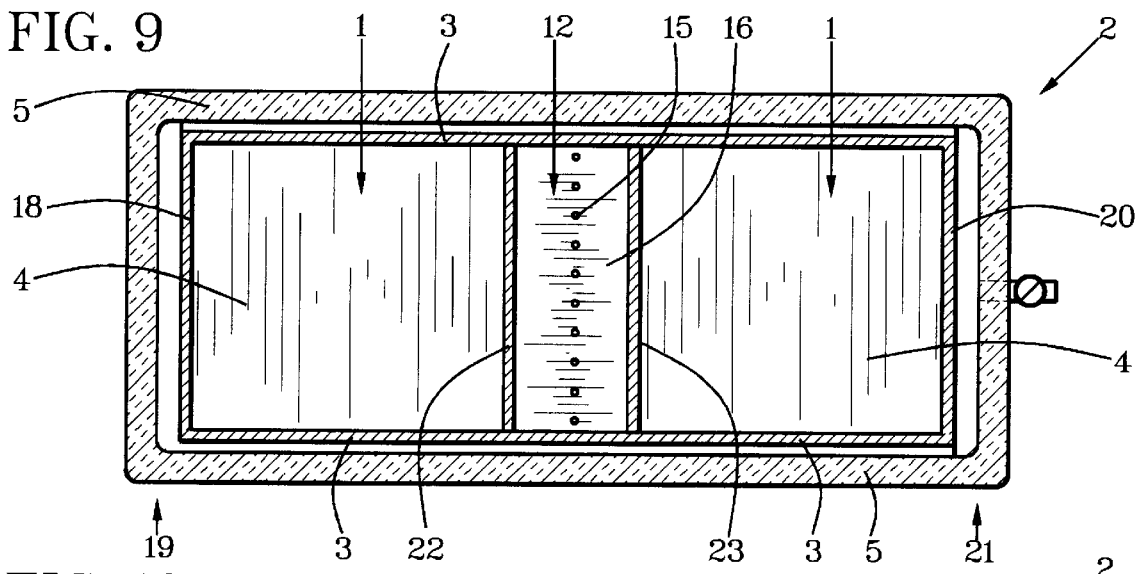
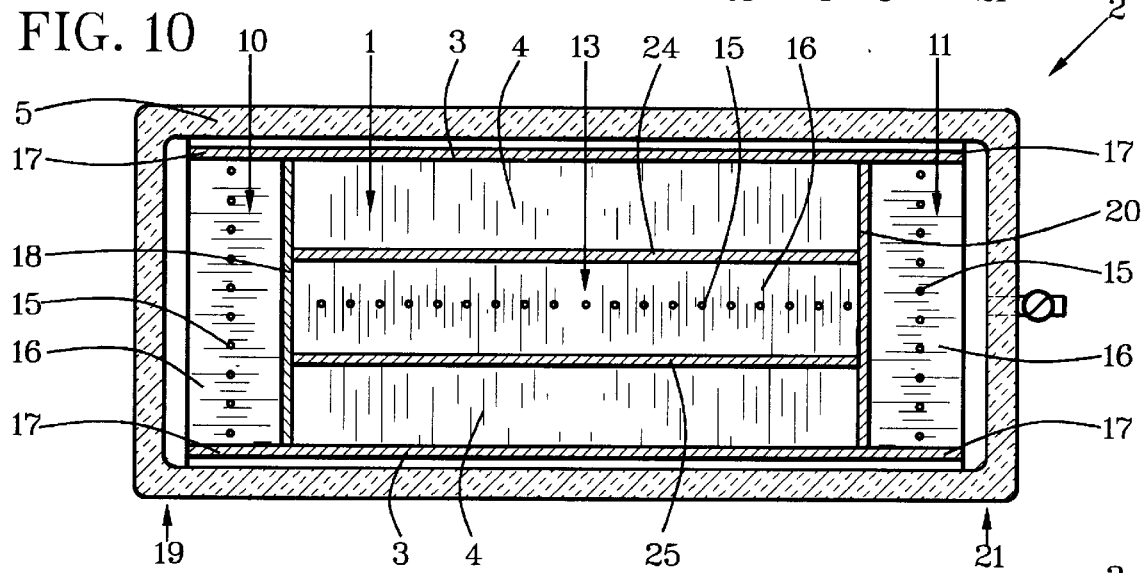
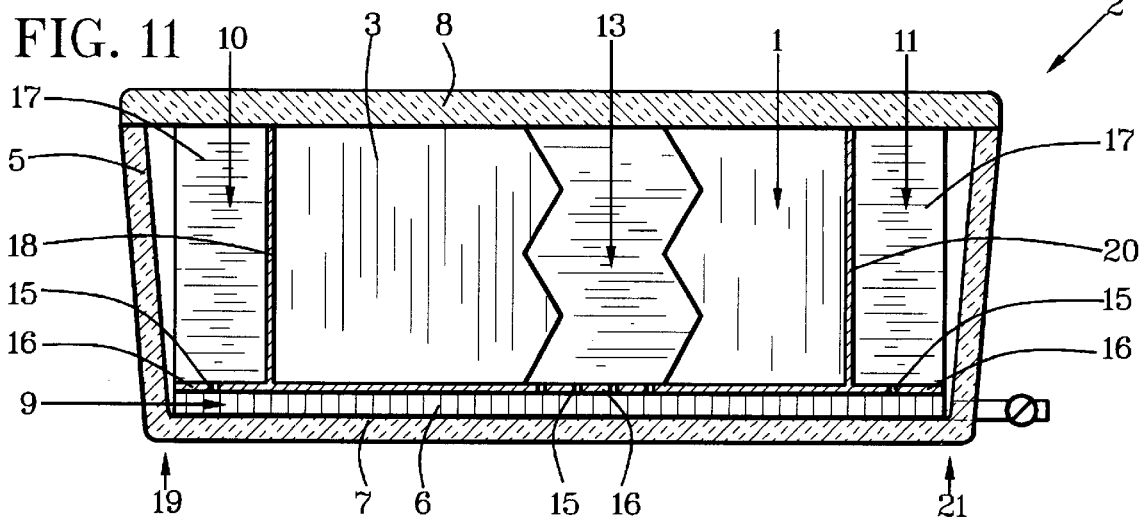

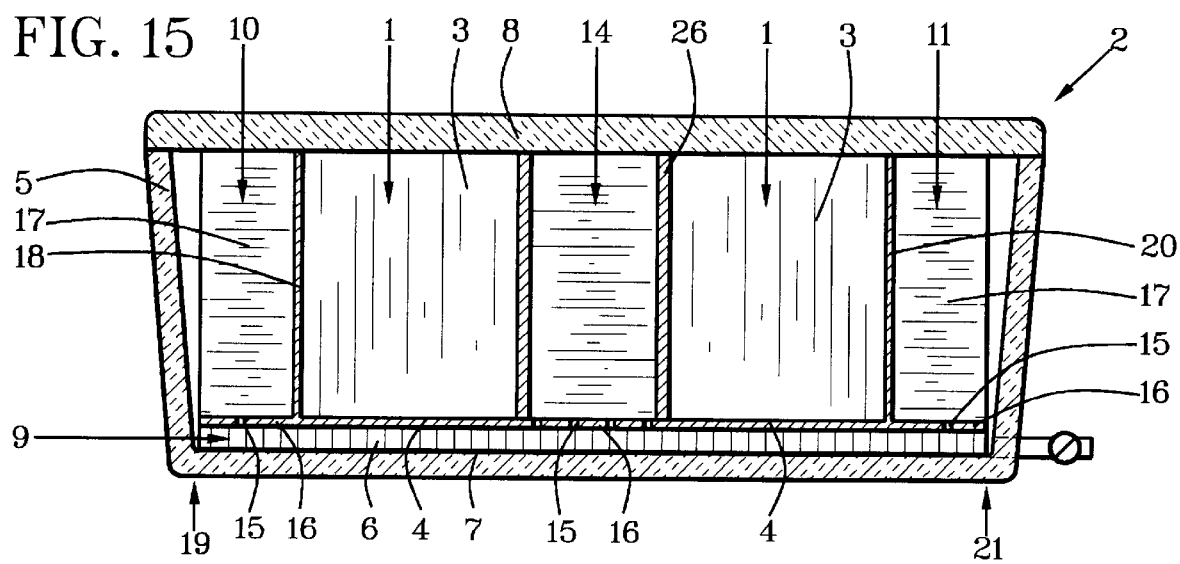
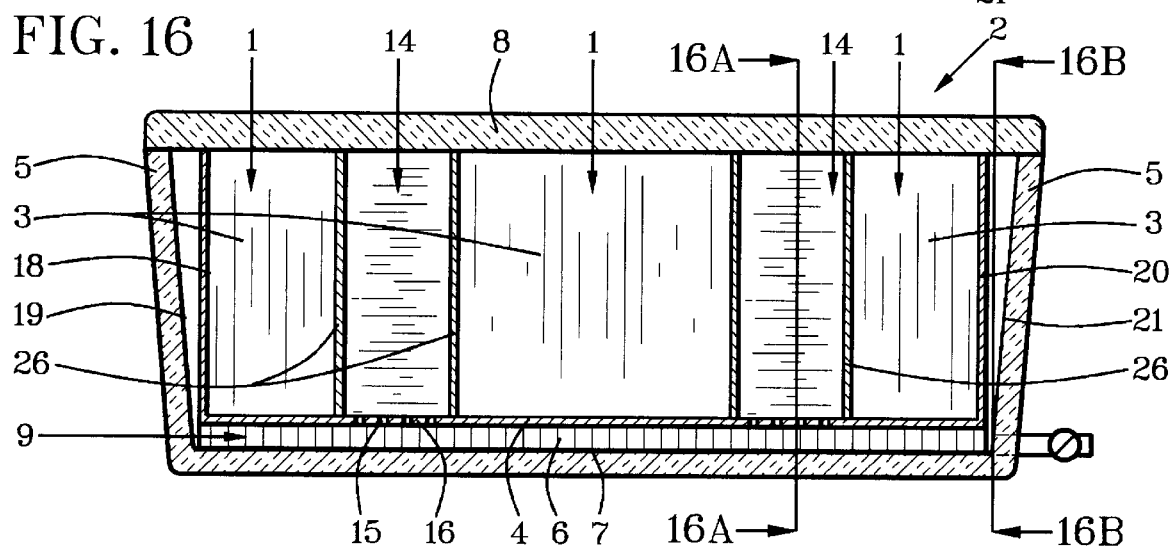
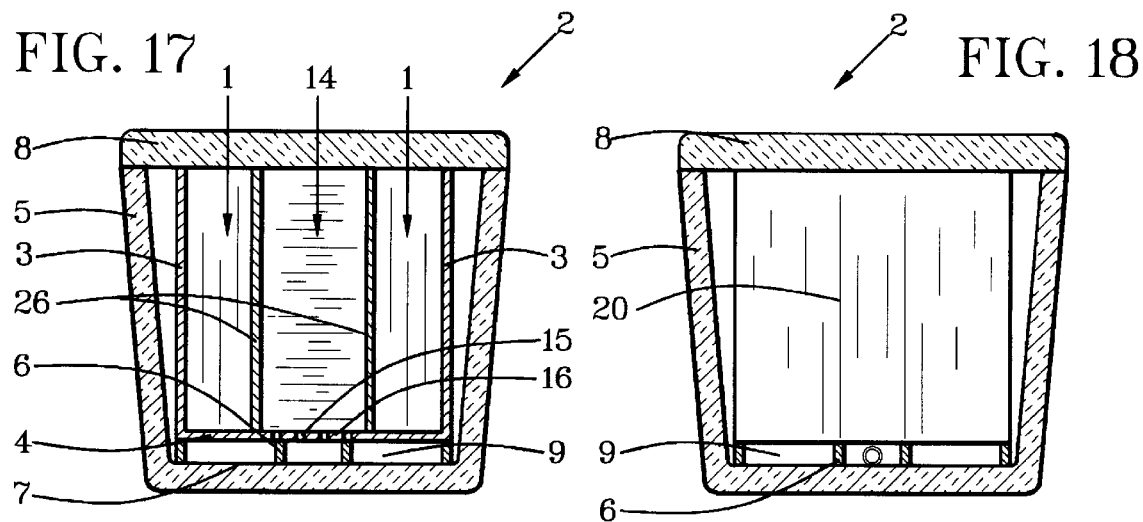

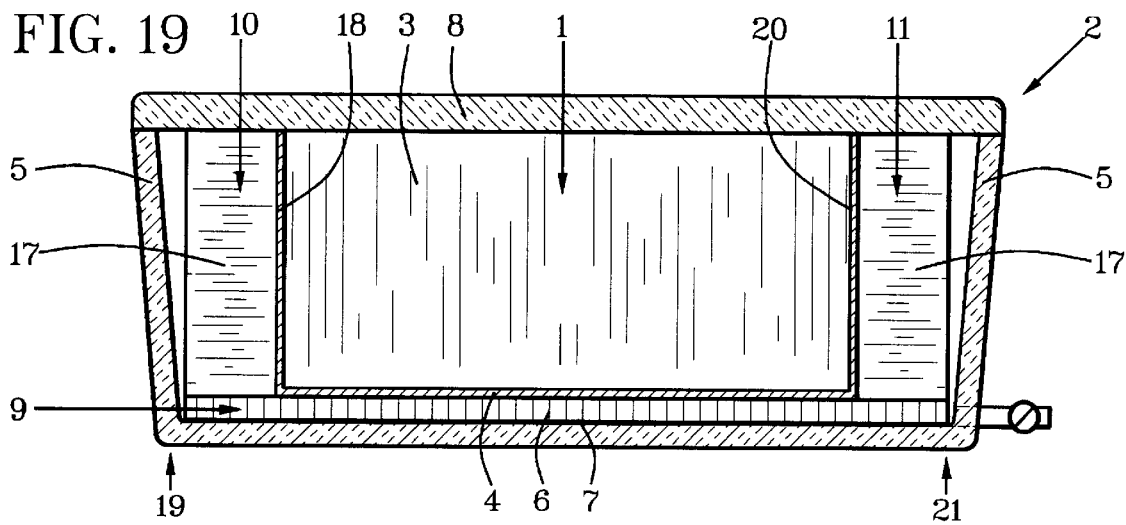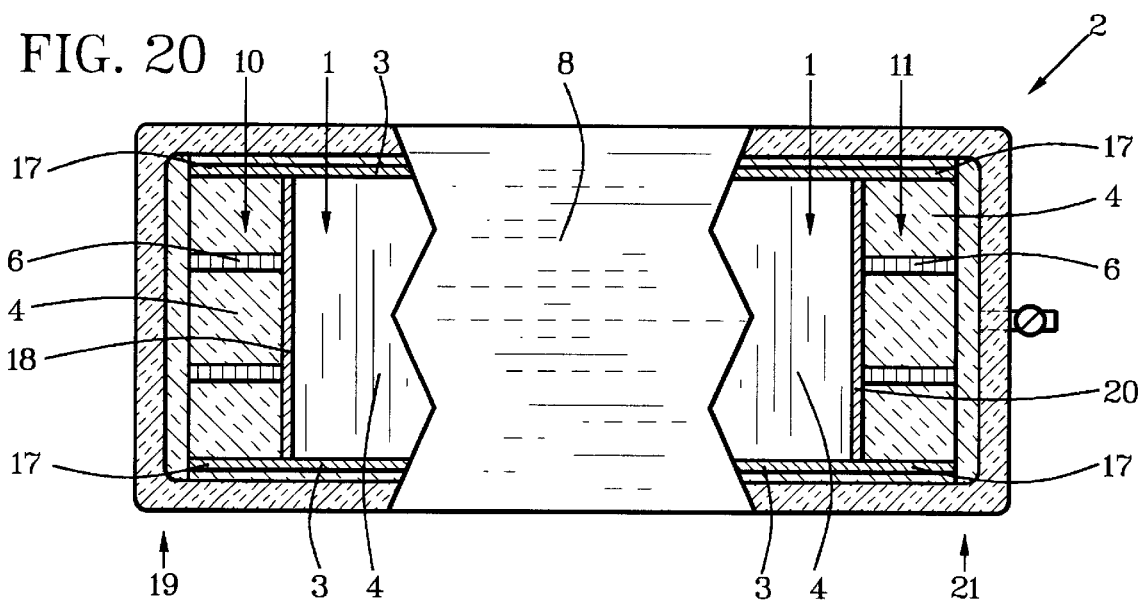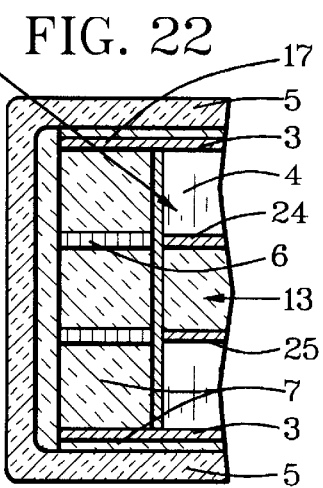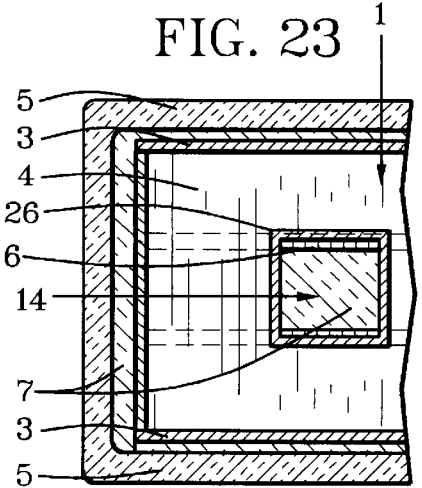

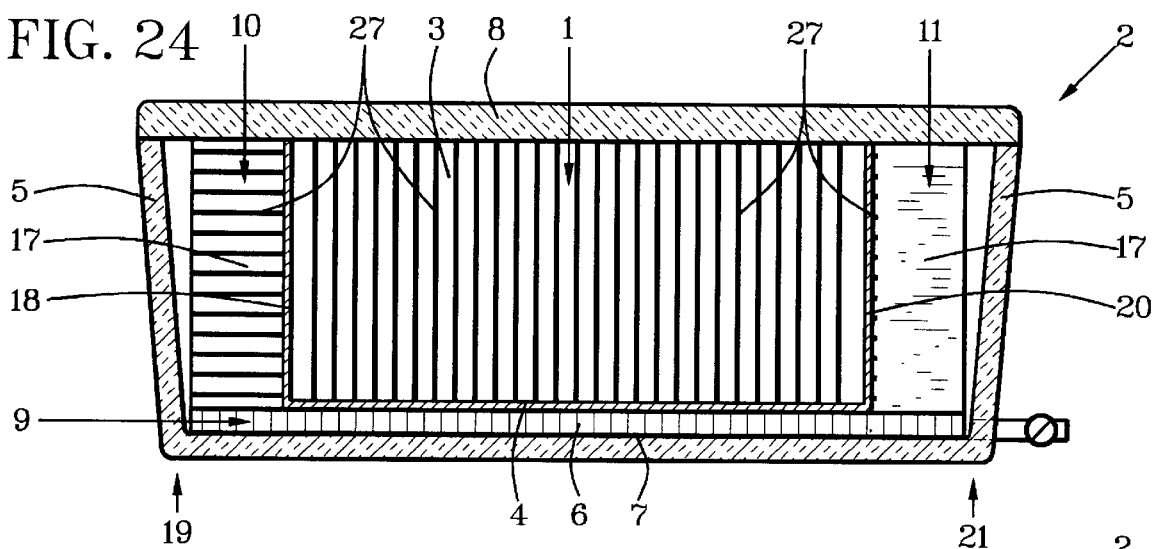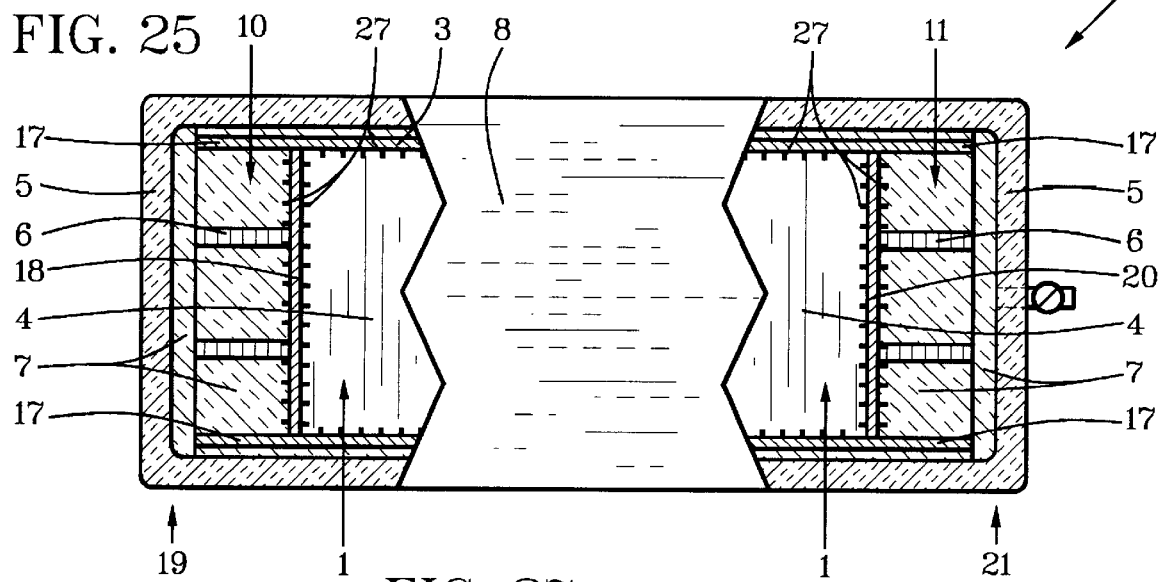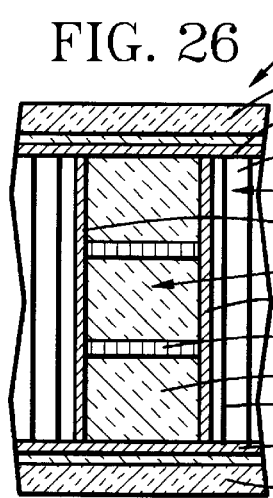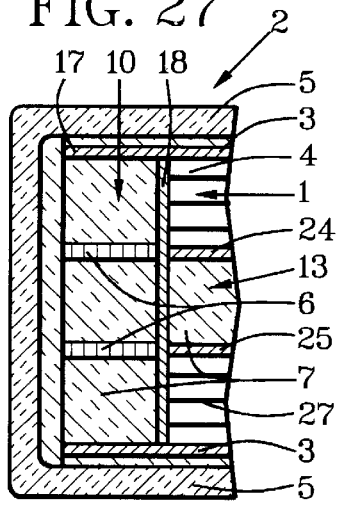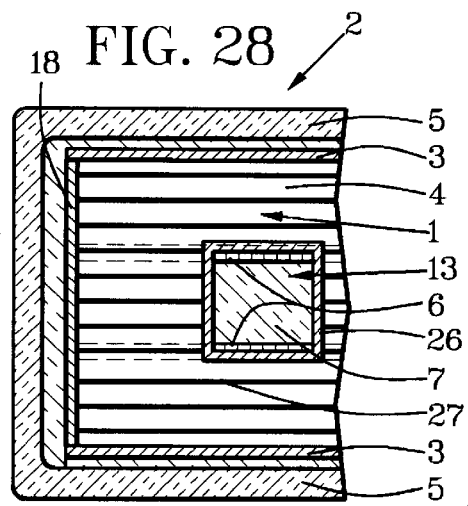

DRY COMPARTMENT COOLER

BACKGROUND OF THE INVENTION

This invention relates to ice coolers and more particularly to picnic and travel coolers with dry compartments into which food is placed separately from ice outside of the dry compartments to prevent water from the ice in the coolers from contacting and contaminating the food while the ice and cold water from the ice keep the food cool.

Coolers with ice kept separately from food are well-known, but not with a cooling compartment separate from one or more ice compartments in a manner taught by this invention.

Examples of most-closely related known but different devices are described in the following patent documents:

| U.S. Pat. No. | Inventor | Issue Date |
| --- | --- | --- |
| 4,565,074 | Morgan | Jan. 21, 1986 |
| 4,424,687 | Morgan | Jan. 10, 1984 |
| 5,052,184 | Jarvis | Oct. 01, 1991 |
| 5,636,524 | Woods, et al. | Jun. 10, 1997 |
| 6,126,124 | Wagner | Oct. 03, 2000 |
| 5,052,185 | Spahr | Oct. 01, 1991 |
| 5,524,761 | Wayman | Jun. 11, 1996 |
| 5,605,056 | Brown, et al. | Feb. 25, 1997 |

SUMMARY OF THE INVENTION

Objects of patentable novelty and utility taught by this invention are to provide a dry-compartment cooler which:

keeps food separated from ice and water in iced coolers;

is convenient and easy to fill with ice and/items of food while keeping the ice separate from food items and any other items in the cooler;

allows easy and convenient access to food, packages and other items being keep cool with the ice in the cooler;

conveys coldness from ice to food and other items in the cooler efficiently; and is easy to recharge with fresh ice.

This invention accomplishes these and other objectives with a dry-compartment cooler having a dry compartment with compartment walls that are connected water-tightly to a compartment floor. The compartment walls are articulated to extend upwardly from proximate a riser framework on a cooler floor to proximate a bottom side of a cooler lid of a predetermined cooler. One or more ice compartments separates ice and water from inside surfaces of the compartment walls and from space inside of the dry compartment. The ice compartments are in fluid communication intermediate proximate the bottom side of the cooler lid and a framework space where the riser framework is positioned under the cooler floor. The framework space is in fluid communication with an optional outlet valve in a cooler bottom for draining water melted from ice in the cooler. The compartment walls can have coldness absorbers and moisture deterrents. The ice compartments can have ice-compartment walls with heat-conveyance members for transmitting coldness from the ice to the inside surfaces of the compartment walls and to the space inside of the dry compartment.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 1 is a partially cutaway side elevation view of a dry-compartment cooler having end ice compartments at opposite ends of a dry compartment;

FIG. 2 is a partially cutaway top view of the FIG. 1 illustration;

FIG. 3 is a section view through section line 2A of FIG. 2;

FIG. 4 is a section view through section line 2B of FIG. 2;

FIG. 9 is a partially cutaway top view of the dry-compartment cooler having the transverse ice compartment extended intermediate opposite sides of the dry compartment that does not include the end ice compartments;

FIG. 10 is a partially cutaway top view of the dry-compartment cooler having a linear ice compartment in addition to the end ice compartments at opposite ends of a dry compartment that does not include the end ice compartments;

FIG. 11 is a partially cutaway side view of the FIG. 10 illustration;

FIG. 15 is a partially cutaway side view of the FIG. 13 illustration;

FIG. 16 is a partially cutaway side view of the FIG. 14 illustration;

FIG. 17 is a section view through section line 16A of FIG. 16;

FIG. 18 is a section view through section line 16B of FIG. 16;

FIG. 19 is a partially cutaway side elevation view of the dry-compartment cooler having a plurality of the end ice compartments that bottom into the riser-framework space without ice-compartment floors having water apertures;

FIG. 20 is a partially cutaway top view of the FIG. 19 illustration;

FIG. 21 is a partially cutaway fragmentary top-central view of the dry-compartment cooler having the transverse ice compartments that bottom into the riser-framework space without the ice-compartment floor having the water apertures;

FIG. 22 is a partially cutaway fragmentary top view at a first end of the dry-compartment cooler that has the linear ice compartment that bottoms into the riser-framework space without an ice-compartment floor having the water apertures;

FIG. 23 is a partially cutaway fragmentary top view from the first end of the dry-compartment cooler having the inside ice compartment that bottoms into the riser-framework space;

FIG. 24 is a partially cutaway side elevation view of the dry-compartment cooler having heat-conveyance members shown extended from ends and sides;

FIG. 25 is a partially cutaway top view of the FIG. 24 illustration;

FIG. 26 is a partially cutaway fragmentary top view of the dry-compartment cooler having the heat-conveyance members shown extended upwardly from the dry-compartment floor at opposite sides of the transverse ice compartment that opens into the riser-framework space without the ice-compartment floor and the water apertures;

FIG. 27 is a partially cutaway fragmentary top view of the dry-compartment cooler having the heat-conveyance members shown extended upwardly from the dry-compartment floor at opposite sides of the linear ice compartment that opens into the riser-framework space without the ice-compartment floor having the water apertures; and FIG. 28 is a partially cutaway fragmentary top view of the dry-compartment cooler having the heat-conveyance members shown extended upwardly from the dry-compartment floor at opposite sides of the inside ice compartment that opens into the riser-framework space without the ice-compartment floor and the water apertures.

DESCRIPTION OF PREFERRED EMBODIMENT

Figure 5:
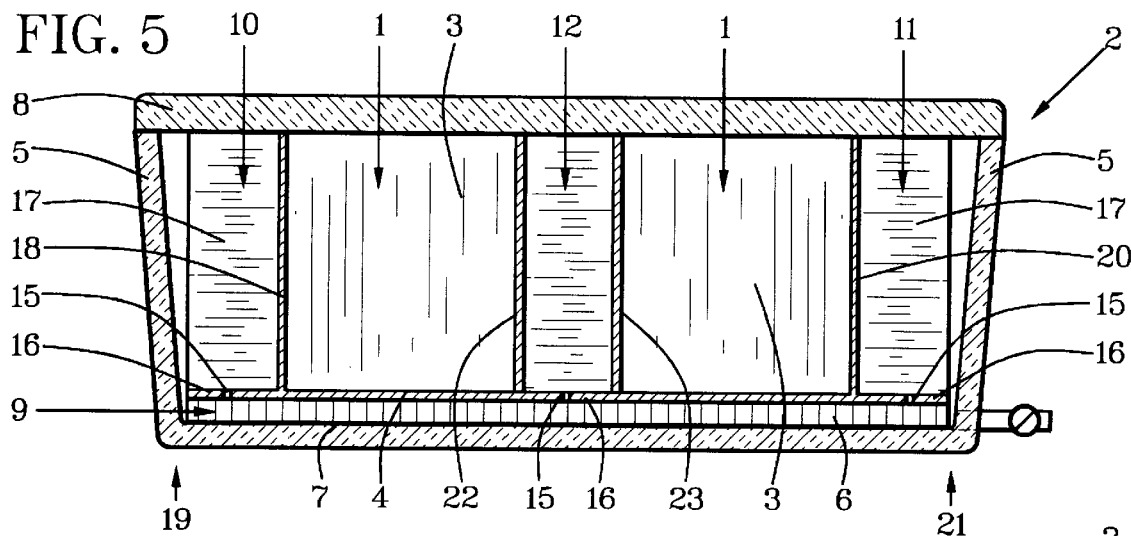
FIG. 5 is a partially cutaway side elevation view of the dry-compartment cooler having a transverse ice compartment in addition to the end ice compartments.

Listed numerically below with reference to the drawings are terms used to describe features of this invention. These terms and numbers assigned to them designate the same features throughout this description.

1. Dry compartment
2. Dry-compartment cooler
3. Compartment walls
4. Compartment floor
5. Cooler walls
6. Riser framework
7. Cooler floor
8. Cooler lid
9. Riser-framework space
10. First-end ice compartment
11. Second-end ice compartment
12. Transverse ice compartment
13. Linear ice compartment
14. Inside ice compartment
15. Water apertures
16. Ice-compartment floors
17. Side-wall extension
18. First end of dry compartment
19. First end of cooler
20. Second end of dry compartment
21. Second end of cooler
22. First interior wall
23. Second interior wall
24. First side of linear ice compartment
25. Second side of linear ice compartment
26. Peripheral wall
27. Heat-conveyance members Referring to FIGS. 1–4, a dry compartment 1 for a dry-compartment cooler 2 has compartment walls 3 with watertight connection to a compartment floor 4. The dry compartment 1 is a boxlike enclosure having predetermined size and shape with the compartment walls 3 being vertical and the compartment floor 4 being horizontal to fit predeterminedly within interior surfaces of cooler walls 5 of a predetermined cooler that is converted thereby to the dry-compartment cooler 2. The compartment floor 4 rests on or can be articulated to rest on a riser framework 6 on a cooler floor 7 of the predetermined cooler. The compartment walls 3 are articulated, sized and shaped to extend upwardly from proximate the riser framework 6 to proximate a bottom side of a cooler lid 8 of the predetermined cooler. One or more ice compartments is in fluid communication for containing ice, any water melted from the ice, and/or other cooling medium intermediate proximate the bottom side of the cooler lid and riser-framework space 9 in which the riser framework 6 is positioned under the compartment floor 4.

The one or more ice compartments can be end ice compartments that include a first-end ice compartment 10 and a second-end ice compartment 11 illustrated in FIGS. 1–2, 5–6, 10–11, 13, 15, 19–20 and 24–25. In addition to the first-end ice compartment 10 and/or the second-end ice compartment 11, the ice compartments can include at least one transverse ice compartment 12 depicted in FIGS. 5–6, 9, 21, and 26; a linear ice compartment 13 shown in FIGS. 10–12, 22 and 27; or at least one inside ice compartment 14 as illustrated in FIGS. 13–17, 23 and 28.

For fluid communication of the one or more ice compartments with the riser-framework space 9 in which the riser framework 6 is positioned under the compartment floor 4, there can be water apertures 15 in ice-compartment floors 16 as shown in FIGS. 1–2, 4–7 and 9–17. Optionally, the ice-compartment floors 16 can be omitted for directly un-restricted fluid communication with the riser-framework space 9 on the cooler floor 7 as illustrated in FIGS. 19–28.

The first-end ice compartment 10 is intermediate oppositely disposed sidewall extensions 17 of the compartment walls 3 that are extended intermediate an external periphery of a first end 18 of the dry compartment 1 and an internal periphery of a first end 19 of the predetermined cooler. The second-end ice compartment 11 is intermediate oppositely disposed sidewall extensions 17 of the compartment walls 3 that are extended intermediate an external periphery of a second end 20 of the dry compartment 1 and an internal periphery of a second end 21 of the predetermined cooler.

The first-end ice compartment 10 includes an ice enclosure intermediate surfaces of the inside periphery of the first end 19 of the dry-compartment cooler 2, an outside periphery of the first end 18 of the dry compartment 1, an inside periphery of a first sidewall extension 17, an inside periphery of a second sidewall extension 17, the top surface of a first end cooler floor 7 of the dry-compartment cooler 2, and a first-compartment portion of a bottom surface area of the cooler lid 8. The second-end ice compartment 11 includes an ice enclosure intermediate surfaces of the inside periphery of the second end 21 of the dry-compartment cooler 2, an outside periphery of the second end of the dry compartment 1, an inside periphery of a first sidewall extension 17, an inside periphery of a second sidewall extension 17, the top surface of a second end cooler floor 7 of the dry-compartment cooler 2, and a second-compartment portion of a bottom surface area of the cooler lid 8.

Figure 6:
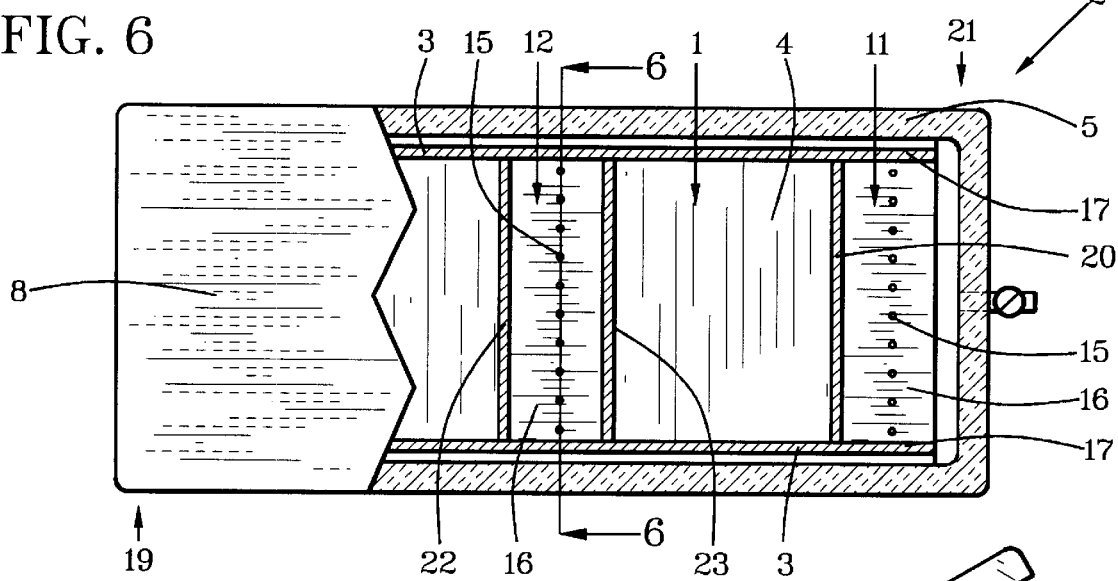
FIG. 6 is a partially cutaway top view of the FIG. 5 illustration.
Figure 7:
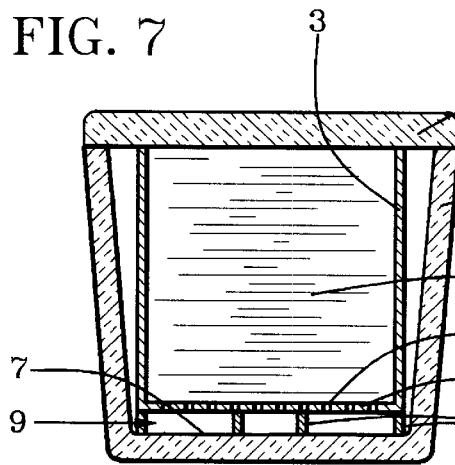
FIG. 7 is a section view through section line 6 of FIG. 6.
Figure 8:
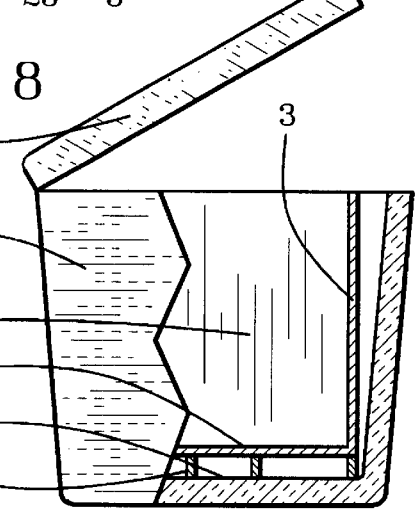
FIG. 8 is a partially cutaway end view of the dry-compartment cooler having a dry compartment resting on a riser framework on a cooler floor of a predetermined cooler and showing a lid in partially open mode.

The at least one transverse ice compartment 12 is intermediate oppositely disposed interior sides of the compartment walls 3 and oppositely disposed interior ends which are the first end 18 and the second end 20 of the compartment walls 3 of the dry compartment 1 as shown in FIGS. 5–6 and 9. The transverse ice compartment 12 includes a first interior wall 22 on a first side of the transverse ice compartment 12 and a second interior wall 23 on a second side. The first interior wall 22 and the second interior wall 23 of the transverse ice compartment 12 extend horizontally intermediate an inside surface of a first side of the compartment wall 3 and an inside surface of a second side of the compartment wall 3 of the dry compartment 1. The first interior wall 22 and the second interior wall 23 of the transverse ice compartment 12 extend vertically from top edges of the first side of the dry compartment 1 and the second side of the dry compartment 1 to bottom edges of the first side of the compartment wall 3 and the second side of the compartment wall 3 of the dry compartment 1.

The transverse ice compartment 12 includes an ice enclosure intermediate surfaces of an inside periphery of the first interior wall 22 of the transverse ice compartment 12, an inside periphery of the second interior wall 23 of the transverse ice compartment 12, a transverse portion of a top surface of the cooler floor 7 of the predetermined cooler, and a transverse portion of a bottom surface area of the cooler lid 8.

Figure 12:
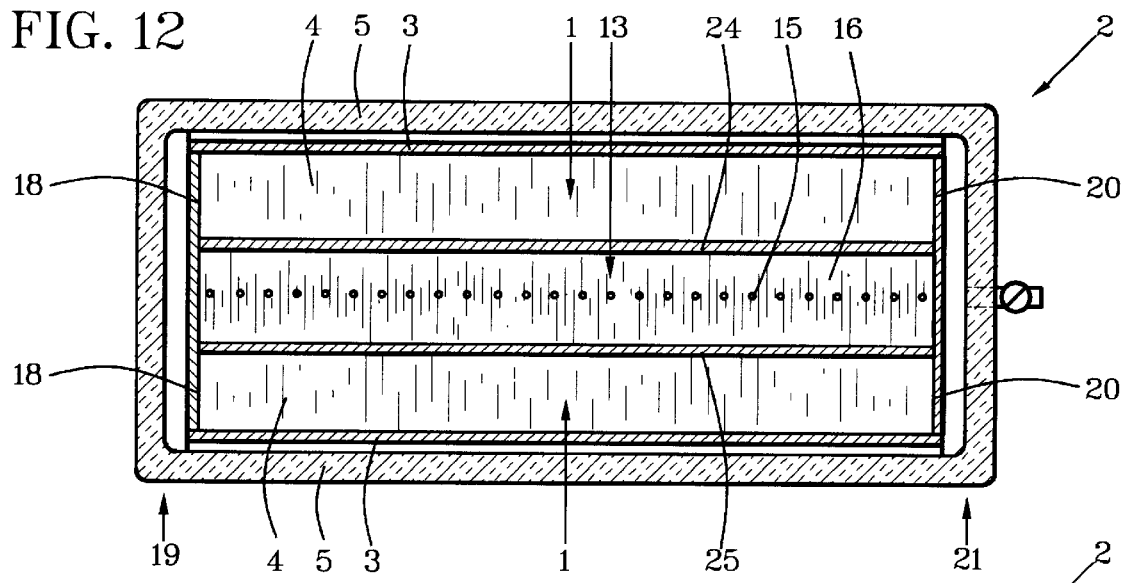
FIG. 12 is a partially cutaway top view of the dry-compartment cooler having the linear ice compartment extended intermediate opposite ends of the dry compartment.
Figure 13:
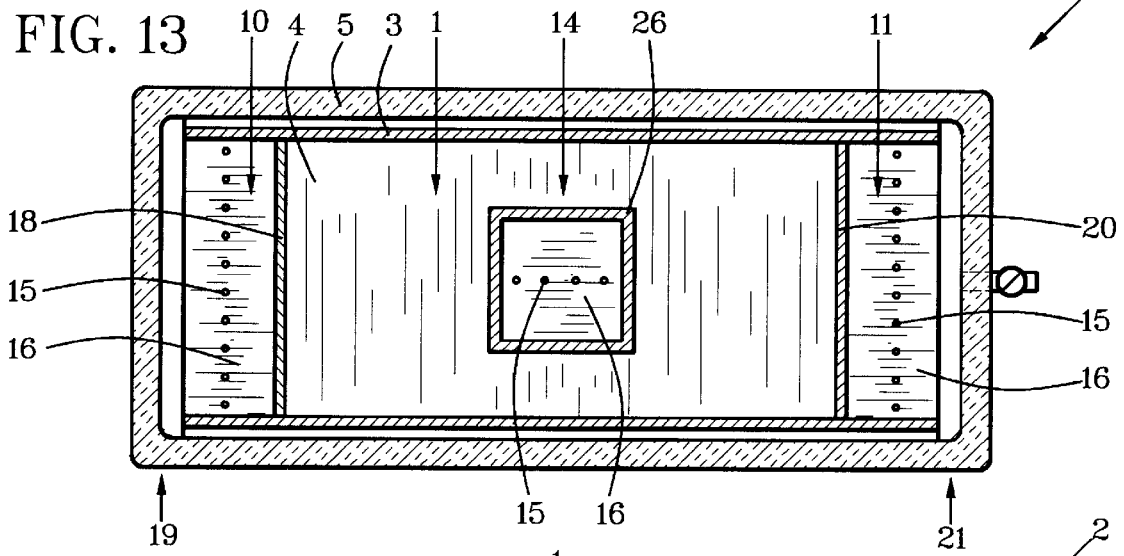
FIG. 13 is a partially cutaway top view of the dry-compartment cooler having an inside ice compartment in addition to the end ice compartments.
Figure 14:
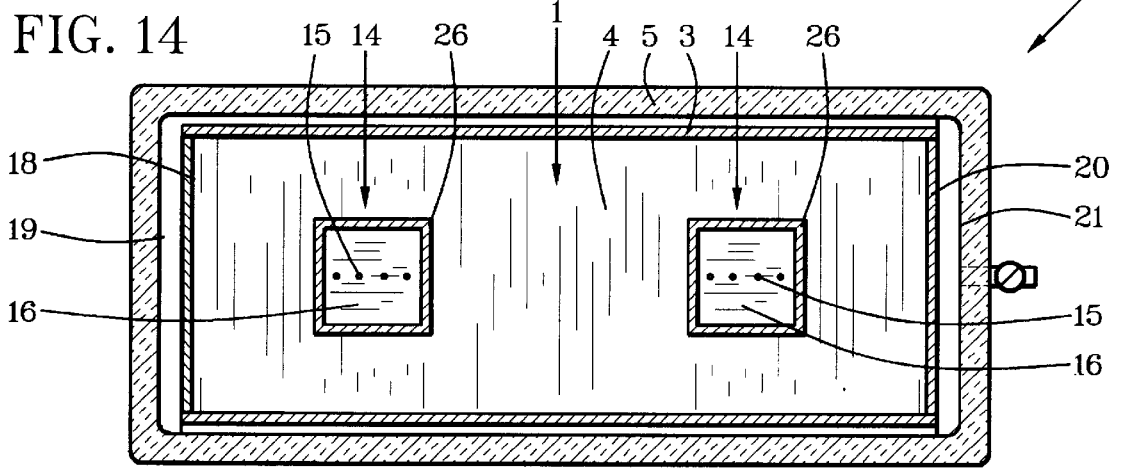
FIG. 14 is a partially cutaway top view of the dry-compartment cooler having a plurality of the inside ice compartments intermediate opposite ends of the dry compartment.

As shown in FIGS. 10–12, the at least one linear ice compartment 13 is intermediate oppositely disposed interior sides of the compartment walls 3 of the dry compartment 1 and oppositely disposed interior ends which are the first end 18 and the second end 20 of the dry compartment 1. The linear ice compartment 13 includes a first interior wall on a first side 24 of the linear ice compartment 13 and a second interior wall on a second side of the linear ice compartment 25. The first interior wall 22 and the second interior wall 23 of the linear ice compartment 13 extend horizontally intermediate an inside surface of the first end 18 of the dry compartment 1 and an inside surface of the second end 20 of the dry compartment 1. The first interior wall and the second interior wall of the linear ice compartment 13 extend vertically from top edges of the first end 18 of the dry compartment 1 and the second end 20 of the dry compartment 1 to bottom edges of the first end 18 and the second end 20 of the dry compartment 1.

The linear ice compartment 13 includes an ice enclosure intermediate surfaces of an inside periphery of the first compartment wall 3 of the linear ice compartment 1, an inside periphery of the second compartment wall 3 of the linear ice compartment 13, a linear portion of a top surface of the cooler floor 7 of the predetermined cooler, and a linear portion of a bottom surface area of the cooler lid 8.

As shown in FIGS. 13–17, the one or more ice compartments include at least one inside ice compartment 14 that has a peripheral wall 26 which extends horizontally about the inside ice compartment 14 intermediate oppositely disposed interior sides of the compartment walls 3 and oppositely disposed interior ends which are the first end 18 and the second end 20 of the dry compartment 1. The peripheral wall 26 extends vertically upward from the bottom of the compartment floor 4 to the bottom surface of an inside portion of the cooler lid 8.

The inside ice compartment 14 includes an ice enclosure intermediate inside surfaces of an inside periphery of the peripheral wall 26, the inside portion of the bottom surface of the cooler lid 8, and an inside portion of the top surface of the cooler floor 7 of the predetermined cooler.

As depicted in FIGS. 1–28, the dry compartment cooler 2 is articulated to include compartment walls 3 of the dry compartment 1 that are positioned predetermined distances from inside surfaces of the cooler walls 5 of the predetermined cooler. This facilitates transfer of coldness uniformly to an outside periphery of the dry compartment 1 for transfer to the inside periphery of the dry compartment 1.

Optionally, as shown in FIGS. 24–28, the compartment walls 3 and walls of the ice compartments 10, 11, 12 and 14 can include heat-conveyance members 27 extended from either or all surfaces thereof. The heat-exchange members 27 are preferably shallow fins.

The compartment walls can include heat-conductive material predeterminedly. Copper and aluminum are preferred. Stainless steels should be avoided unless used only as a host material on which to coat or otherwise apply copper and/or aluminum.

A new and useful dry-compartment cooler having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A dry-compartment cooler comprising:
   a dry compartment having compartment walls with water-tight connection to a compartment floor;
   the dry compartment being a boxlike enclosure with the compartment walls being vertical and the compartment floor being horizontal to fit predeterminedly within interior surfaces of cooler walls of a predetermined cooler;
   the compartment floor having a bottom surface resting on a riser framework on a cooler floor of the predetermined cooler;
   the compartment walls being articulated to extend upwardly from proximate the riser framework to proximate a bottom side of a cooler lid of the predetermined cooler; and
   one or more ice compartments in fluid communication intermediate proximate the bottom side of the cooler lid and riser-framework space in which the riser framework is positioned under the compartment floor.

2. The dry-compartment cooler of claim 1 wherein:
   the one or more ice compartments includes a first-end ice compartment intermediate oppositely disposed sidewall extensions of the compartment walls that are extended intermediate an external periphery of a first end of the dry compartment and an internal periphery of a first end of the predetermined cooler.

3. The dry-compartment cooler of claim 2 wherein:
   the one or more ice compartments includes a second-end ice compartment intermediate oppositely disposed sidewall extensions of the compartment walls that are extended intermediate an external periphery of a second end of the dry compartment and an internal periphery of a second end of the predetermined cooler.

4. The dry-compartment cooler of claim 1 wherein:
   the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

5. The dry-compartment cooler of claim 1 wherein:

the one or more ice compartments includes at least one transverse ice compartment intermediate oppositely disposed interior sides and oppositely disposed interior ends of the compartment walls;

the transverse ice compartment includes a first interior wall on a first side of the transverse ice compartment and a second interior wall on a second side of the transverse ice compartment;

the first interior wall and the second interior wall of the transverse ice compartment extend horizontally intermediate an inside surface of a first side of the dry compartment and an inside surface of a second side of the dry compartment; and the first interior wall and the second interior wall of the transverse ice compartment extend vertically from top edges of the first side of the dry compartment and the second side of the dry compartment to bottom edges of the first side of the dry compartment and the second side of the dry compartment.

6. The dry-compartment cooler of claim 1 wherein:

the one or more ice compartments includes at least one linear ice compartment intermediate oppositely disposed interior sides and oppositely disposed interior ends of the dry compartment;

the linear ice compartment includes a first interior wall on a first side of the linear ice compartment and a second interior wall on a second side of the linear ice compartment;

the first interior wall and the second interior wall of the linear ice compartment extend horizontally intermediate an inside surface of a first end of the dry compartment and an inside surface of a second end of the dry compartment; and the first interior wall and the second interior wall of the linear ice compartment extend vertically from top edges of the first end of the dry compartment and the second end of the dry compartment to bottom edges of the first end of the dry compartment and the second end of the dry compartment.

7. The dry-compartment cooler of claim 1 wherein:

the one or more ice compartments includes at least one inside ice compartment having a peripheral wall that extends horizontally about the inside ice compartment intermediate oppositely disposed interior sides and oppositely disposed interior ends of the dry compartment; and the peripheral wall extends vertically upward from the bottom of the floor of the dry compartment to the bottom surface of an inside portion of the cooler lid.

8. The dry-compartment cooler of claim 7 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

9. The dry-compartment cooler of claim 8 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

10. The dry-compartment cooler of claim 5 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

11. The dry-compartment cooler of claim 10 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

12. The dry-compartment cooler of claim 6 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

13. The dry-compartment cooler of claim 12 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

14. The dry-compartment cooler of claim 1 wherein: the compartment walls include heat-conductive material predeterminedly.

15. The dry-compartment cooler of claim 14 wherein: the heat-conductive material includes aluminum.

16. The dry-compartment cooler of claim 15 wherein: the heat-conductive material includes copper.

17. The dry-compartment cooler of claim 14 wherein: the heat-conductive material includes copper.

18. The dry-compartment cooler of claim 1 wherein:

the dry compartment is articulated to include walls of the dry compartment that are positioned predetermined distances from inside surfaces of side walls of the predetermined cooler for allowing predetermined fluid communication intermediate the outside surfaces of the compartment walls and the inside surfaces of the sides of the predetermined cooler.

19. The dry-compartment cooler of claim 1 wherein:

the compartment walls include heat-conveyance members extended therefrom.

20. The dry-compartment cooler of claim 1 wherein:

the one or more ice compartments include heat-conveyance surfaces having heat-conveyance members extended therefrom.

21. A cooler dry compartment comprising:

a dry compartment having compartment walls with watertight connection to a compartment floor;

the dry compartment being a boxlike enclosure with the compartment walls being vertical and the compartment floor being horizontal to fit predeterminedly within interior surfaces of cooler walls of a predetermined cooler;

the compartment floor being articulated to rest on a riser framework positioned on a cooler floor of the predetermined cooler;

the compartment walls being articulated to extend upwardly from proximate the riser framework to proximate a bottom side of a cooler lid of the predetermined cooler; and one or more ice compartments in fluid communication intermediate proximate the bottom side of the cooler lid and riser-framework space in which the riser framework is positioned on the cooler floor.

22. The cooler dry compartment of claim 21 wherein:

the one or more ice compartments includes a first-end ice compartment intermediate oppositely disposed sidewall extensions of the compartment walls that are extended intermediate an external periphery of a first end of the dry compartment and an internal periphery of a first end of the predetermined cooler.

23. The cooler dry compartment of claim 22 wherein:

the one or more ice compartments includes a second-end ice compartment intermediate oppositely disposed sidewall extensions of the compartment walls that are extended intermediate an external periphery of a second end of the dry compartment and an internal periphery of a second end of the predetermined cooler.

24. The cooler dry compartment of claim 21 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

25. The cooler dry compartment of claim 21 wherein:

the one or more ice compartments includes at least one transverse ice compartment intermediate oppositely disposed interior sides and oppositely disposed interior ends of the compartment walls;

the transverse ice compartment includes a first interior wall on a first side of the transverse ice compartment and a second interior wall on a second side of the transverse ice compartment;

the first interior wall and the second interior wall of the transverse ice compartment extend horizontally intermediate an inside surface of a first side of the dry compartment and an inside surface of a second side of the dry compartment; and the first interior wall and the second interior wall of the transverse ice compartment extend vertically from top edges of the first side of the dry compartment and the second side of the dry compartment to bottom edges of the first side of the dry compartment and the second side of the dry compartment.

26. The cooler dry compartment of claim 21 wherein:

the one or more ice compartments includes at least one linear ice compartment intermediate oppositely disposed interior sides and oppositely disposed interior ends of the compartment walls;

the linear ice compartment includes a first interior wall on a first side of the linear ice compartment and a second interior wall on a second side of the linear ice compartment;

the first interior wall and the second interior wall of the linear ice compartment extend horizontally intermediate an inside surface of a first end of the dry compartment and an inside surface of a second end of the dry compartment; and the first interior wall and the second interior wall of the linear ice compartment extend vertically from top edges of the first end of the dry compartment and the second end of the dry compartment to bottom edges of the first end of the dry compartment and the second end of the dry compartment.

27. The cooler dry compartment of claim 21 wherein:

the one or more ice compartments includes at least one inside ice compartment having a peripheral wall that extends horizontally about the inside ice compartment intermediate oppositely disposed interior sides and oppositely disposed interior ends of the compartment walls; and the peripheral wall extends vertically upward from the bottom of the floor of the dry compartment to the bottom surface of an inside portion of the cooler lid.

28. The cooler dry compartment of claim 27 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

29. The cooler dry compartment of claim 28 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

30. The cooler dry compartment of claim 25 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

31. The cooler dry compartment of claim 30 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

32. The cooler dry compartment of claim 26 wherein:

the one or more ice compartments includes the first-end ice compartment intermediate oppositely disposed sidewall extensions of the compartment walls that are extended intermediate the external periphery of the first end of the dry compartment and the internal periphery of the first end of the predetermined cooler.

33. The cooler dry compartment of claim 32 wherein:

the one or more ice compartments includes the second-end ice compartment intermediate oppositely disposed sidewall extensions of the compartment walls that are extended intermediate the external periphery of the second end of the dry compartment and the internal periphery of the second end of the predetermined cooler.

* * * * *